Patented Oct. 31, 1944

2,361,532

UNITED STATES PATENT OFFICE 2,361,532

TREATMENT OF TERPENE ALCOHOLS

Richard F. B. Cox, Wilmington, Del., assignor to Hercules Powder Company, Wilmington, Del., a corporation of Delaware No Drawing. Application March 29, 1941, Serial No. 385,864

13 Claims. (Cl. 260—618)

This invention relates to a method for treating certain terpene alcohols and more particularly it relates to a process for converting primary and secondary hydroxymenthenes to hydroxymenthanes and to hydroxyaromatic derivatives. It also relates to the products obtained.

It is an object of this invention to obtain solvents of increased stability and decreased unsaturation from primary and secondary hydroxymenthenes and from materials rich in such compounds. It is a further object to prepare hydroxymenthanes from primary and secondary hydroxymenthenes. It is a still further object to obtain hydroxy derivatives of cymene and like aromatic compounds from primary and secondary hydroxymenthenes. Other objects will appear hereinafter.

These objects are attained in accordance with this invention by treatment of a primary or secondary hydroxymenthene which comprises subjecting the compound or a fraction rich therein to the action of a dehydrogenation catalyst at a reaction temperature until an appreciable reduction in the unsaturation of the material being treated has taken place. The treatment brings about a reaction of the hydroxymenthene with itself, as a result of which a portion of the compound gains hydrogen atoms to become a hydroxymenthane, and another portion of the compound loses hydrogen atoms to become an aromatic compound; i. e., a hydroxy derivative of a cymene. No hydrogen is added to the reactant, the reduction in unsaturation being brought about in the absence of free hydrogen. The treatment may be continued for a time sufficient merely to bring about an appreciable decrease in unsaturation or it may be continued until further decrease in unsaturation ceases. The product obtained may be used as such or component compounds therein may be recovered from the reaction mixture.

The starting material for the method in accordance with this invention will be any hydroxymenthene having a hydroxyl group on a primary or secondary carbon atom. The material being treated may be, for example, dihydrocarveol, piperitol, isopulegol, carveol, perillyl alcohol, and the like. Any hydroxymenthene having a hydroxyl on carbon atoms Nos. 2, 3, 7 and 9 using the system of numbering found in Bernthsen, Textbook of Organic Chemistry, Sudborough revision, 1922 edition, D. Van Nostrand Company, New York, New York, page 609 and page 613 is suitable. Carbon atoms Nos. 5, 6 and 10 are included since they duplicate Nos. 2, 3 and 9, respectively, in function. The carbon atom corresponding to No. 7 may be in the ortho and meta position as well as in the para position as in the paramenthenes. The term "menthenes" as used herein includes the mentha-dienes.

The catalyst utilized to bring about the reaction according to this invention will comprise one or more of the dehydrogenation type, the catalytic metals of group 8 of the periodic table being most suitable. Such catalysts as, for example, Raney nickel catalyst, nickel on kieselguhr, platinum, palladium, and the like work well. It will be noted that these metals function both as hydrogenation catalysts and as dehydrogenation catalysts. Catalysts may be used in a finely divided condition such as represented by platinum black and palladium black or may be supported upon a catalyst carrier for use in suspension, or as a catalyst bed. Such carriers as, for example, silica, alumina, charcoal, coke, kieselguhr, and the like are suitable.

The reaction in accordance with this invention requires temperatures above ordinary room temperatures and of such elevation as to bring about reaction with the particular catalyst employed. The material being reacted is heated to a temperature within the range between about 90° C. and about 200° C. in the presence of the catalyst and maintained in the said range until the reaction has progressed to a desired extent of completion. Preferably, the reaction will be carried out at a temperaure within the range of about 150° C. and about 175° C. The reaction occurs at any pressure, ordinary atmospheric pressures being suitable.

The time of reaction depends upon the temperature, the particular catalyst utilized, and upon the extent to which it is desired to complete the reaction. In general, the reaction is continued until the desired reduction in unsaturation is brought about. The course of the reaction is conveniently followed by determining the iodine, bromine, or thiocyanogen number of the reactant and of the reaction mixture as the treatment progresses for those reactions in which a primary alcohol is reacted upon. Where complete reaction is desired the reaction is continued until no further reduction in iodine number takes place. Usually a very appreciable drop in iodine number occurs within a very few minutes, and complete reaction is usually obtained in less than about 8 hours.

The course of the reaction of secondary alcohols leading to phenols which have a bromine or iodine number per se cannot be followed by halogen or thiocyanogen titration. However, the conversion to phenols can be followed by determining the alkali soluble material which increases as phenols are formed.

The reaction mixture may include solvents inert to the material treated, for example, hexane, benzene, toluene, xylene, ethylene or propylene under pressure, ethyl acetate, etc.

The products obtained by the treatment in accordance with this invention will be a mixture of hydroxymenthanes and of hydroxyaromatic compounds both of which have the carbon structure and the hydroxyl position thereon corresponding to the hydroxymenthene used as the starting material. Thus, for example, a primary hydroxymenthene, such as 7-hydroxyparamenthadiene (perillyl alcohol) reacts to form a mixture of 7-hydroxyparamenthane and 7-hydroxyparacymene. The primary terpene alcohols thus furnish hydroxyaromatic derivatives carrying the hydroxyl upon the methyl or isopropyl groups. When a secondary hydroxymenthene such as 3-hydroxyparamenthene (isopulegol) is reacted, a mixture of 3-hydroxyparamenthane and 3-hydroxyparacymene is obtained. The 2-hydroxymenthenes yield carvacrol and carvomenthol. The 3-hydroxymenthenes yield thymol and menthol. The secondary hydroxymenthenes react to form phenols. Where the starting material is a hydroxymenthadiene it forms about 1 part of a hydroxymenthane for each 2 parts of a hydroxycymene derivative; where it is a hydroxymenthene with one double bond, it forms about 2 parts of hydroxymenthane for each part of hydroxycymene derivative.

Substantially complete reaction of a fairly pure reactant brings about substantially complete elimination of unsaturation. However, where unsaturated diluents are present they will cause unsaturation in the mixture obtained after the reaction.

The reaction mixture may be used in the form obtained if desired or it may be resolved into its component products. This may be accomplished by fractional distillation preferably under vacuum or by solvent extraction, utilizing such extractants as, for example, liquid SO₂, phenol rendered liquid by the addition of water, and the like to extract aromatic constituents. Phenolic products are most readily recovered by extraction with dilute aqueous sodium or potassium hydroxide followed by acidification of the extract. Extractions of this nature yield a fraction enriched in the hydroxycymene formed and a fraction enriched in the hydroxymenthane formed.

The method in accordance with this invention will be illustrated by the specific examples which follow. All parts and percentages are by weight.

Example 1

Ten parts isopulegol and 2 parts catalyst (5% palladium on magnesium carbonate) were heated at 150-175° C. for 30 minutes. The resulting oil was extracted with 10% sodium hydroxide. The caustic solution was acidified with dilute sulfuric acid to liberate 2 parts thymol. The alkali insoluble oil had a strong odor of menthol. The unreacted isopulegol was removed by shaking with 2% potassium permanganate. The oil thus freed of unsaturated material contained cymene and a mixture of menthols.

Example 2

Ten parts of perillyl alcohol (7-hydroxy-1,8-paramenthadiene) and 2 parts Raney nickel were heated at 150° C. for 16 hours. At the end of this period essentially all of the unsaturation as shown by bromine titration had disappeared. The resulting alcohol mixture was esterified with acetic anhydride in pyridine to form a mixed acetate plasticizer for cellulose derivatives and similarly with phthalic anhydride to form a mixture of phthalate esters of similar use.

Example 3

One hundred parts piperitol (para-menthen-1-ol-3) were heated at 150° C. for 6 hours with 10 parts palladium on charcoal (5% palladium). The resulting oil contained thymol and a mixture of menthols. The thymol was removed by extraction with 5% sodium hydroxide and the menthols were purified by forming their benzoates, crystallizing the benzoates, and hydrolyzing the purified benzoate.

The products obtained by the treatment in accordance with the method of this invention are excellent solvents of the slow evaporating type for cellulose ester lacquers and the like. They are especially good solvents for soluble phenolic resins, alkyd resins, and other resins in formulative work and in varnishes. The separated products find use as solvents and as intermediates, acetates, propionates, benzoates, phthalates, for example, being suitable for plasticizing cellulose derivatives. The phenolic derivatives are valuable germicides.

It will be understood that the details and examples hereinbefore set forth are illustrative only and that the invention as broadly described and claimed is in no way limited thereby.

What I claim and desire to protect by Letters Patent is:

1. A process which comprises treating a monohydroxy terpene alcohol selected from the group of hydroxymenthenes and hydroxymenthadienes having the hydroxyl radical in the 2, 3, 7 and 9 position with a dehydrogenation catalyst having a dehydrogenating metal as the active ingredient at a temperature between about 90° C. and about 200° C. until a mixture of hydroxymenthane and hydroxyaromatic compound, both having carbon structures and hydroxyl positions corresponding to the compound treated, is produced from the hydroxymenthene, and separating the product from the catalyst.

2. A process which comprises treating a monohydroxy terpene alcohol selected from the group of hydroxymenthenes and hydroxymenthadienes having the hydroxyl radical in the 2, 3, 7 and 9 position with a dehydrogenation catalyst having a dehydrogenating metal as the active ingredient at a temperature between about 90° C. and about 200° C. until a mixture of hydroxymenthane and hydroxyaromatic compound, both having carbon structures and hydroxyl positions corresponding to the compound treated, is produced from the hydroxymenthene, and recovering the hydroxymenthane and the hydroxyaromatic compound from the reaction mixture.

3. A process which comprises treating a monohydroxy terpene alcohol selected from the group of hydroxymenthenes and hydroxymenthadienes having the hydroxyl radical in the 2, 3, 7 and 9 position with a dehydrogenation catalyst containing a metal of group 8 of the periodic system as active ingredient at a temperature between about 90° C. and about 200° C. until a mixture of hydroxymenthane and hydroxyaromatic compound, both having carbon structures and hydroxyl positions corresponding to the compound treated, is produced from the hydroxymenthene, and separating the product from the catalyst.

4. A process which comprises treating a monohydroxy terpene alcohol selected from the group of hydroxymenthenes and hydroxymenthadienes having the hydroxyl radical in the 2, 3, 7 and 9 position with a dehydrogenation catalyst containing a metal of group 8 of the periodic system as active ingredient at a temperature between about 90° C. and about 200° C. until a mixture of hydroxymenthane and hydroxyaromatic compound, both having carbon structures and hydroxyl positions corresponding to the compound treated, is produced from the hydroxymenthene, and recovering the hydroxymenthane and the hydroxyaromatic compound from the reaction mixture.

5. A process which comprises treating a monohydroxy terpene alcohol selected from the group of hydroxymenthenes and hydroxymenthadienes having the hydroxyl radical in the 2, 3, 7 and 9 position with a dehydrogenation catalyst containing nickel as active ingredient at a temperature between about 90° C. and about 200° C. until a mixture of hydroxymenthane and hydroxyaromatic compound, both having carbon structures and hydroxyl positions corresponding to the compound treated, is produced from the hydroxymenthene, and separating the product from the catalyst.

6. A process which comprises treating a monohydroxy terpene alcohol selected from the group of hydroxymenthenes and hydroxymenthadienes having the hydroxyl radical in the 2, 3, 7 and 9 position with a dehydrogenation catalyst containing nickel as active ingredient at a temperature between about 90° C. and about 200° C. until a mixture of hydroxymenthane and hydroxyaromatic compound, both having carbon structures and hydroxyl positions corresponding to the compound treated, is produced from the hydroxymenthene, and recovering the hydroxymenthane and the hydroxyaromatic compound from the reaction mixture.

7. A process which comprises treating a monohydroxy terpene alcohol selected from the group of hydroxymenthenes and hydroxymenthadienes having the hydroxyl radical in the 2, 3, 7 and 9 position with a dehydrogenation catalyst containing palladium as active ingredient at a temperature between about 90° C. and about 200° C. until a mixture of hydroxymenthane and hydroxyaromatic compound, both having carbon structures and hydroxyl positions corresponding to the compound treated, is produced from the hydroxymenthene, and separating the product from the catalyst.

8. A process which comprises treating a monohydroxy terpene alcohol selected from the group of hydroxymenthenes and hydroxymenthadienes having the hydroxyl radical in the 2, 3, 7 and 9 position with a dehydrogenation catalyst containing palladium as active ingredient at a temperature between about 90° C. and about 200° C. until a mixture of hydroxymenthane and hydroxyaromatic compound, both having carbon structures and hydroxyl positions corresponding to the compound treated, is produced from the hydroxymenthene, and recovering the hydroxymenthane and hydroxyaromatic compound from the reaction mixture.

9. A process which comprises treating a 3-hydroxymenthene with a dehydrogenation catalyst having a dehydrogenating metal as the active ingredient at a temperature between about 90° C. and about 200° C. until a mixture of thymol and menthol is produced from the 3-hydroxymenthene, and separating the mixture from the catalyst.

10. A process which comprises treating a 3-hydroxymenthene with a dehydrogenation catalyst having a dehydrogenating metal as the active ingredient at a temperature between about 90° C. and about 200° C. until a mixture of thymol and menthol is produced from the 3-hydroxymenthene, separating the mixture from the catalyst, and extracting the thymol from the mixture with aqueous alkali metal hydroxide.

11. A process which comprises treating isopulegol with a dehydrogenation catalyst containing a metal of group 8 on the periodic system as active ingredient, at a temperature between about 90° C. and about 200° C. until a mixture of thymol and menthol is produced.

12. A process which comprises treating piperitol with a dehydrogenation catalyst containing a metal of group 8 on the periodic system as active ingredient, at a temperature between about 90° C. and about 200° C. until a mixture of thymol and menthol is produced.

13. A process which comprises treating perillyl alcohol with a dehydrogenation catalyst containing a metal of group 8 on the periodic system as active ingredient, at a temperature between about 90° C. and about 200° C. until a mixture of the corresponding hydroxy para-menthane and the corresponding hydroxy para-cymene are produced from the perillyl alcohol.

RICHARD F. B. COX.